United States Patent [19]

Lucian, deceased

[11] 4,256,965

[45] Mar. 17, 1981

[54] HIGH ENERGY FLUOROSCOPIC SCREEN

[75] Inventor: A. D. Lucian, deceased, late of Carmichael, Calif., by Betty J. Lucian, Administrator

[73] Assignee: The United States of America as represented by the Secretary of the Navy, Washington, D.C.

[21] Appl. No.: 3,437

[22] Filed: Jan. 15, 1979

[51] Int. Cl.[3] ...................... G01T 1/20; G01N 23/22; G01T 1/00

[52] U.S. Cl. .................................. 250/367; 250/460; 250/486

[58] Field of Search ............... 250/460, 483, 486, 487, 250/367

[56] References Cited

U.S. PATENT DOCUMENTS

| | | | |
|---|---|---|---|
| 3,225,193 | 12/1965 | Hilton et al. | 250/367 |
| 3,829,700 | 8/1974 | Buchanan et al. | 250/483 |
| 3,872,309 | 3/1975 | De Belder et al. | 250/483 |
| 3,903,416 | 9/1975 | Fox | 250/358 T |
| 3,992,627 | 11/1976 | Stewart | 250/460 |

*Primary Examiner*—Alfred E. Smith
*Assistant Examiner*—Carolyn E. Fields
*Attorney, Agent, or Firm*—R. S. Sciascia; Charles D. B. Curry; Francis I. Gray

[57] ABSTRACT

A high energy fluoroscopic screen for converting photons into light. A high-Z foil converts a portion of the photon flux field from a specimen irradiated by photons into secondary radiations which cause a phosphor layer to luminesce. A polycellular image converter (PIC) gathers the light emitted by the phosphor as well as converting additional photons to light. The light is sensed by a low light level TV chain.

7 Claims, 2 Drawing Figures

HIGH ENERGY FLUOROSCOPIC SCREEN

BACKGROUND OF THE INVENTION

1. Field of the Invention.

The present invention relates to high energy fluoroscopic inspection systems, and more particularly to a high energy fluoroscopic screen for inspecting large objects.

2. Description of Prior Art.

The current practice in radiography of large objects is to use lead intensifying screens to obtain images on an X-ray film. The sensitivity is limited to approximately 2 percent, and the resolution for crack detection is limited by the geometry, i.e., the X-ray beam must be aligned within 5° to detect a crack.

SUMMARY OF THE INVENTION

Accordingly, the present invention provides a high energy fluoroscopic screen which is essentially a three-stage photon-to-light converter. High energy photons absorbed by a specimen provide a varying flux across the face of the screen having three layers. A high-Z foil stops a portion of the photons and emits secondary radiation which causes a phosphor layer to luminesce. A Polycellular Image Converter (PIC) gathers the light as well as converting additional photons to light. The light is piped to the open face of the PIC and visually sensed by a low light level TV chain.

Therefore, it is an object of the present invention to provide a filmless radiographic inspection technique.

Another object of the present invention is to provide a radiographic inspection technique of greater sensitivity and greater certainty of crack detection.

Still another object of the present invention is to provide a dynamic radiographic inspection technique.

Yet another object of the present invention is to provide an efficient photon-to-light high energy fluoroscopic screen.

Other objects, advantages and novel features wll be apparent from the following detailed description when read in view of the appended claims and attached drawing.

DESCRIPTION OF THE PREFERRED EMBODIMENT

Figure 1:
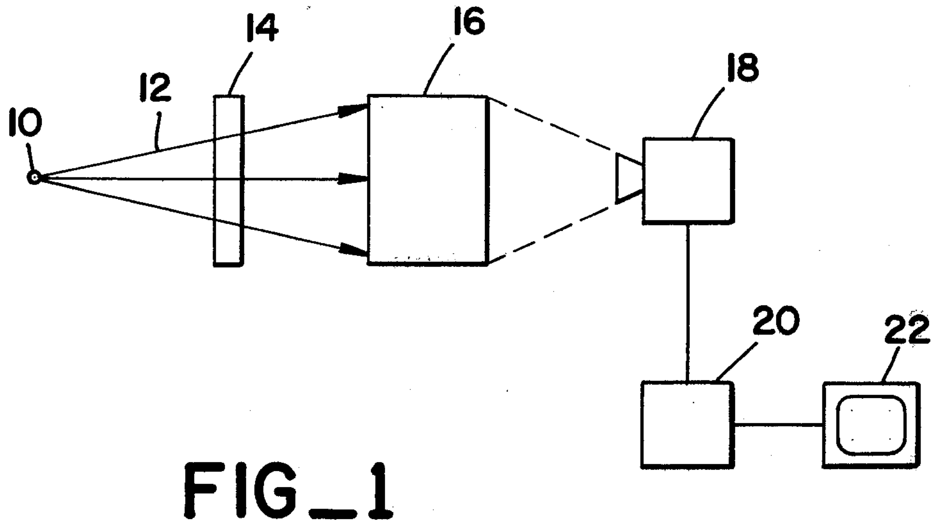
FIG. 1 is a block diagram of a filmless radiographic inspection system according to the present invention.

Referring now to FIG. 1 a high energy X-ray source 10, such as a betatron, linear accelerator, cobalt 60 or the equivalent, emits a high energy photon beam 12 toward a specimen 14, such as a rocket motor, a large casting, a thick weld, a patient or the like. The high energy photons are absorbed by the specimen 14, providing a varying flux across the face of a fluoroscopic screen 16. The screen 16 converts the photons to light which is sensed by a low light level TV camera 18. The signal from TV camera 18 is processed by a signal processing and recording circuit 20. The output of the signal processing and recording circuit 20 is displayed on a high resolution TV monitor 22. The specimen 14 may be continuously moved with respect to the high energy photon beam 12 to permit 100 percent inspection of the specimen.

Figure 2:
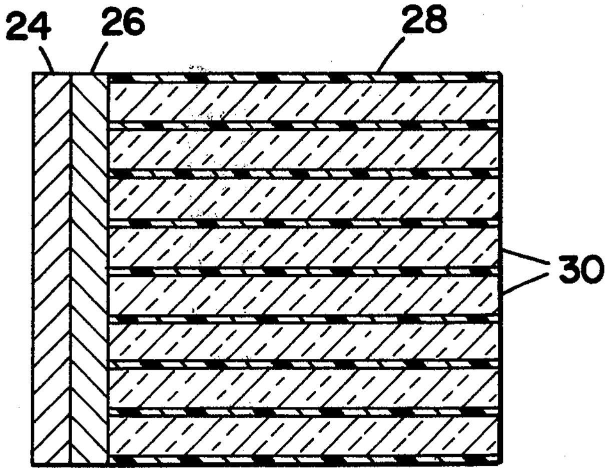
FIG. 2 is a cross-sectional view of the high energy fluoroscopic screen according to the present invention.

The fluoroscopic screen 16 is shown in greater detail in FIG. 2. A high-Z foil 24, selected from tungsten, tantalum, uranium, platinum, rhenium or the like, is coated with a luminescent phosphor 26, such as the oxysulfides of lanthanum, gadolinium or lutetium activated with trivalent terbium disclosed in U.S. Pat. Nos. 3,725,704 and 3,829,700. A polycellular image converter (PIC) 28, such as is described in U.S. Pat. No. 3,225,193 by Hilton et al, is attached to the phosphor 26.

The high-Z foil 24 stops X percent of the photons and emits secondary radiation of low energy characteristic X-rays, electrons and photofission fragments. The secondary radiation causes the phosphor 26 to luminesce. The PIC 28 gathers the light emitted from the phosphor 26. The PIC 28 also collects $\epsilon$(100-X) percent of the remaining photons, where $\epsilon$ is the efficiency of the PIC crystals, and converts these photons to light. The light is piped to the open face 30 of the PIC 28 where it is visually sensed by the low light level TV camera 18.

Thus, the present invention provides a filmless radiographic inspection system with a high energy fluoroscopic screen which achieves sensitivities to 0.01 percent with crack detection approaching a probability of certainty.

What is claimed is:

1. A high energy, filmless radiographic system for inspecting large objects comprising:

(a) means for generating a high energy photon beam;

(b) means for converting the varying photon flux from a specimen irradiated by said high energy photon beam to light, said converting means being a high energy fluoroscopic screen having a high-Z foil to convert a portion of said high energy photon beam to secondary radiation, a phosphor coated on said high-Z foil to convert said secondary radiation to light, and a polycellular image converter (PIC) attached to said phosphor to gather said light and to convert an additional portion of said high energy photon beam to light; and (c) means for sensing and displaying the light from said converting means.

2. A high energy, filmless radiographic system as recited in claim 1 further comprising means for providing continuous motion of said specimen with respect to said high energy photon beam to permit 100 percent inspection of said specimen for cracks.

3. A high energy, filmless radiographic system as recited in claim 2 wherein said high-Z foil comprises a material selected from the group consisting of tungsten, tantalum, uranium, platinum and rhenium.

4. A high energy, filmless radiographic system as recited in claim 2 wherein said phosphor comprises a material selected from the group consisting of oxysulfides of lanthanum, gadolinium or lutetium activated with trivalent terbium.

5. A high energy fluoroscopic screen comprising:

(a) a high-Z foil;

(b) a phosphor coated on said high-Z foil; and (c) a polycellular image converter (PIC) attached to said phosphor.

6. A high energy fluoroscopic screen as recited in claim 5 wherein said high Z-foil comprises a material selected from the group consisting of tungsten, tantalum, uranium, platinum and rhenium.

7. A high energy fluoroscopic screen as recited in claim 5 wherein said phosphor comprises a material selected from the group consisting of oxysulfides of lanthanum, gadolinium or lutetium activated with trivalent terbium.

* * * * *